Dec. 25, 1923. 1,478,633
W. J. BRUCE
DEMOUNTABLE RIM FOR AUTOMOBILE WHEELS
Filed Jan. 24, 1921
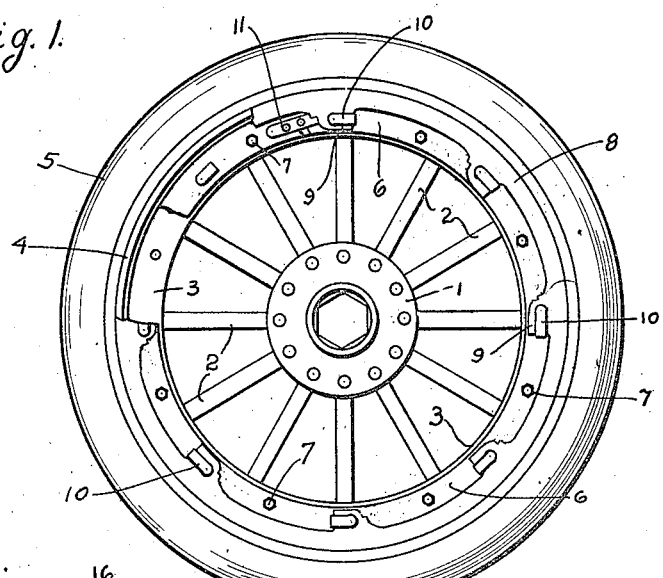
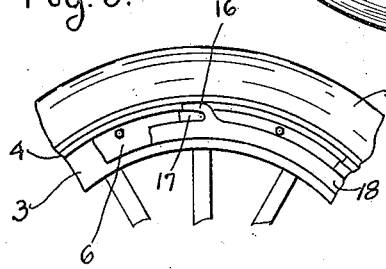
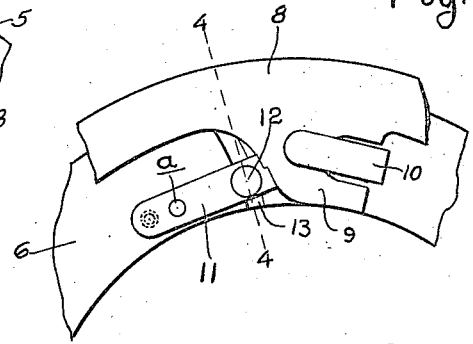
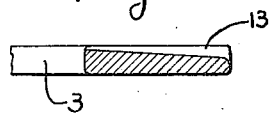
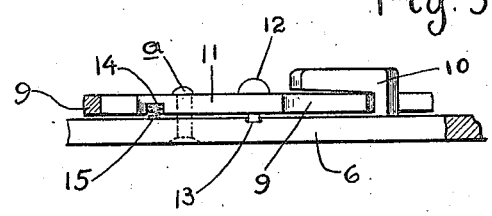
INVENTOR
William J. Bruce,
BY Walter N. Haskell.
his ATTORNEY Patented Dec. 25, 1923.

1,478,633

UNITED STATES PATENT OFFICE.

WILLIAM J. BRUCE, OF ESCANABA, MICHIGAN.

DEMOUNTABLE RIM FOR AUTOMOBILE WHEELS.

Application filed January 24, 1921. Serial No. 439,455.

*To all whom it may concern:*

Be it known that I, WILLIAM J. BRUCE, a subject of the King of Great Britain, residing at Escanaba, in the county of Delta and State of Michigan, have invented certain new and useful Improvements in Demountable Rims for Automobile Wheels, of which the following is a specification.

My invention has reference to demountable rims for automobile wheels, and is an improvement in devices of that class, and more particularly of the character set forth in Letters Patent of the United States No. 1,347,144, issued to me July 20th, 1920. The present device seeks to increase the efficiency and ease of operation of such devices.

The purpose of the invention is to hold the tire rim on the felly of the wheel in such a way that it can be quickly disconnected therefrom, and as quickly replaced, when desired. It consists of two rings, one of which is permanently secured to the felly, and is provided with locking members which cooperate with other members on the movable ring, to hold such movable ring in position, covering the joint between the felly and rim, and maintaining the relative positions thereof. Additional features for preventing the accidental release of the movble rim are also provided.

In the drawings:

Fig. 1 is a side view of an automobile wheel, equipped with my invention.

Fig. 2 is a detail of the devices for locking the plate 8 in place.

Fig. 3 is an edge view thereof.

Fig. 4 is a cross-section of the plate 3 on the line 4—4 of Fig. 2.

Fig. 5 is a fragmentary view showing a modified form of the plate 8.

1 represents the hub of a wheel of usual construction, and 2 the spokes thereof, to which is secured the felly 3. Encircling the felly is a rim 4, to which is attached the casing 5 of a pneumatic tire. Fixed to the outer face of the felly 3 is a circular plate 6, by means of bolts 7 passing through the plate and felly. A similar plate 8 is adapted to be held in place against the plate 6 by means of recessed projections 9 on the plate 8 engaging lugs 10 on the outer face of the plate 6. The diameter of the plate 8 is greater than that of the plate 6, and sufficient to cover the joint between the felly 3 and rim 4, holding such rim securely in place. This will clearly appear in Fig. 1 of the drawings, where a portion of the plates is broken away. To seat the plate 8 on the plate 6 a slight circular movement is imparted thereto, bringing the projections 9 beneath the heads of the lugs 10. The contacting faces of the projections and lugs are preferably oppositely beveled, so as to tend to draw the plate 8 tightly against the plate 6 as the locking movement continues. To detach the plate 8 this operation is reversed. The outer face of the plate 6 forms a sliding bearing for the plate 6 which facilitates the movement thereof by reducing the friction to a minimum.

The lugs 10 are preferably formed integrally with the plate 6, but they can be fitted on the ends of the bolts 7, if desired.

To prevent accidental release of the plate 8 a latch 11 is provided, pivoted to the face of the plate 6 as at *a*, the long end of said latch being fitted to swing outwardly into position in rear of one of the projections 9, to hold the same from movement. Such end of the latch is provided with a pin 12, the inner end of which is slidable in a groove 13 transversely of the plate 6. The bottom of said groove is inclined, so that as the pin is moved inwardly therein there is an increasing amount of friction between the pin and plate, tending to hold the latch in place. To further assist in this the opposite end of the latch is provided in its inner face with a recess 14, containing a small coiled spring 15, the end of which presses against the plate 6. The engagement of the pin 12 with the groove 13 tends to force the long arm of the latch away from the plate 6, with a corresponding movement of the short arm of the latch toward the plate. This tends to increase the tension of the spring 15, which is communicated to the pin 12, making the engagement thereof with the plate 6 more positive.

When it is desired to remove the plate 8, a slight blow from a hammer or other tool will release the latch, and the plate 8 can then be driven in a direction to permit the release thereof.

In Fig. 5 is shown a form of the device wherein the plate 18 is provided on its outer edge with projections 16, engaging with lugs 17 near the outer face of the plate 6. The outer portions of the projections 16 extend beyond the joint between the felly and rim, and hold the rim in place. This form is especially adapted for use with some makes of tires, which have an overhang on the outer side which interferes with the insertion of a plate 8 of usual diameter.

What I claim and desire to secure by Letters Patent, is:

In combination with the felly of a wheel, and rim removably supported thereon, a circular plate fixed to the outer face of said felly, and provided with a plurality of locking devices, projected outwardly therefrom; a circular plate, of sufficient diameter to cover the joint between said felly and rim, provided with projections adapted for detachable engagement with said lugs and having an inclined groove in the outer face thereof; and a latch pivoted on said first-named plate, adapted to engage one of said projections and hold the same against becoming detached said latch being fitted at one end for a sliding engagement with said groove, and at the other end with a friction spring.

In testimony whereof I affix my signature.

WILLIAM J. BRUCE.